Figure 1:
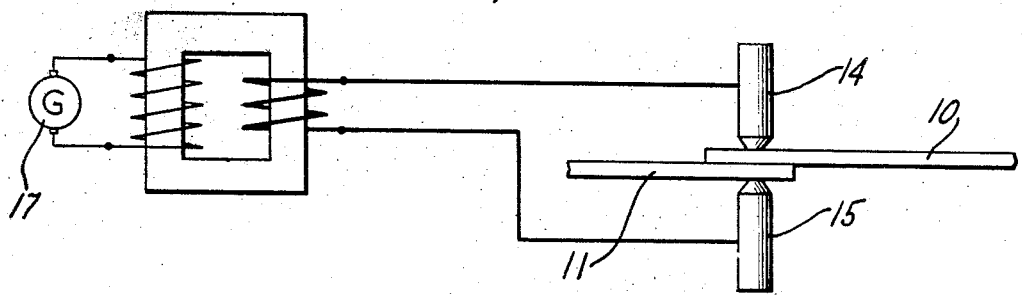

Nov. 6, 1928.

E. PUGH 1,690,377

METHOD OF WELDING PARTS

Filed Sept. 15, 1926

Inventor
Emerson Pugh
by H. A. Pattison Att'y.

Patented Nov. 6, 1928.

1,690,377

UNITED STATES PATENT OFFICE.

EMERSON PUGH, OF CHICAGO, ILLINOIS, ASSIGNOR TO WESTERN ELECTRIC COMPANY, INCORPORATED, OF NEW YORK, N. Y., A CORPORATION OF NEW YORK.

METHOD OF WELDING PARTS.

Application filed September 15, 1926. Serial No. 135,503.

This invention relates to methods of welding parts, and more particularly to methods of electrically welding parts at spaced intervals.

When parts such as the marginal portions of sheet material are joined together in lapped relation by forming welds at spaced intervals, the spacing of these welds, necessarily, has a direct influence upon the strength of the completed joint. It has been found upon experimentation that the strength of the welded joints do not increase in the same manner for multiple welds as do the strength of riveted joints for similar increases in the number of rivets. The reason for this difference in the two types of joints will be clear when it is understood that in making a weld in a localized area, such as in electrical spot welding, the temperature of the pieces of material may vary. This variation in temperature, in some instances, may be due to the difference in the electrical resistances at the point of contact between the electrodes and the respective surfaces of the pieces, in which case the piece having the higher resistance will have a higher surface temperature than the other companion piece. The unequal heating of the pieces in this manner will cause an unequal expansion thereof and if another weld is made immediately thereafter, the two pieces will be joined together at two separated points before the expansion has had a chance to equalize through the interchange of heat. Upon cooling to the original temperature the piece which was heated to the higher temperature will be placed in tension between the formed welds and the other in compression to transmit a stress between the pieces through the weld. This inter-weld stress places the individual welds under an internal stress which may directly affect the strength of the joint. When the dimension between the welds is below a certain value, it has also been found that the weld which is made first may have a larger area than the second weld and this is believed to be due to the current shunting effect of the first weld. If a portion of the welding current is shunted through the first weld as the second weld is being made, the remaining current flowing between the electrodes will not heat as large an area in the pieces and hence the second weld will be smaller and thus weaker than the first. The formation of welds in localized areas at spaced intervals which are not uniform in cross section may directly affect the effective strength of the completed joint.

The primary object of this invention is to provide a simple, economical and effective method of welding parts whereby welds may be formed in uniform, localized areas and deleterious inter-weld stresses may be avoided.

In accordance with these and other objects, one embodiment of the invention contemplates the method of welding pieces whereby upon the successive formation of welds, the heat applied during each welding operation is concentrated or localized within a definite welding zone. In practicing this method one of the pieces is preliminarily recessed or slotted in such a manner that when the parts are welded, inter-weld stresses will be relieved and the flow of the heating current through the weld will be equalized and localized.

Other features and advantages of this invention will be apparent from the following detailed description and the accompanying drawing, wherein—

Figure 2:
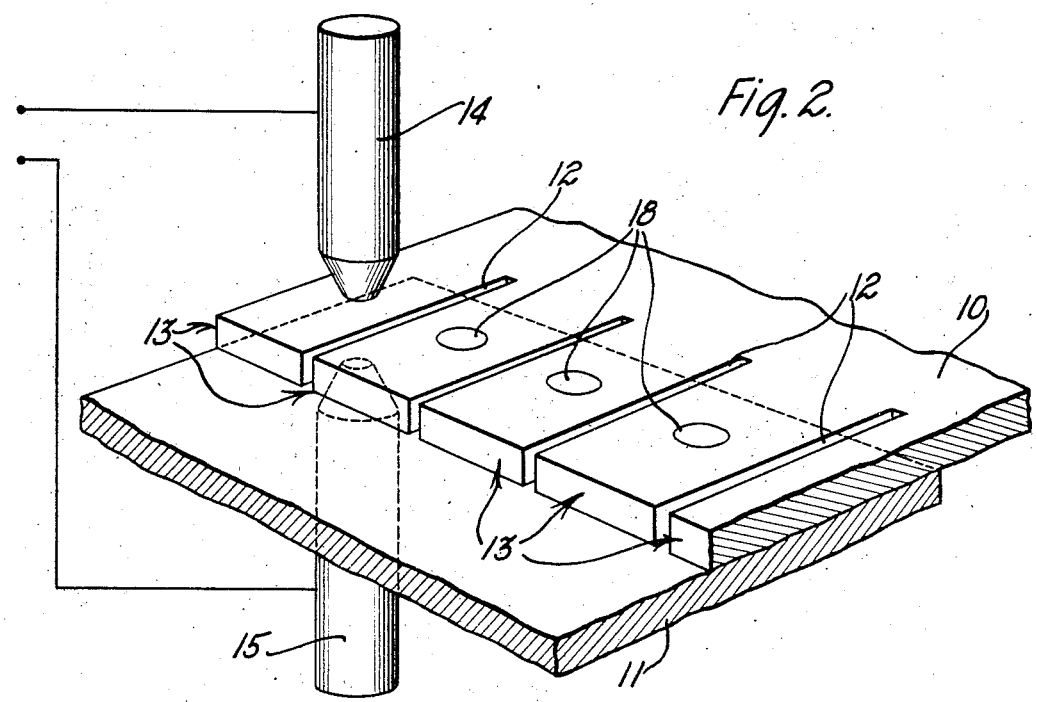

Fig. 1 is a side elevational view of a pair of overlapped pieces of sheet material with welding electrodes associated therewith and connected in an electrical circuit, and Fig. 2 is an enlarged fragmentary perspective view of a pair of the overlapped pieces of material shown in Fig. 1 disclosing the relative positions of the slots and welds.

Referring now to the drawing, wherein like reference numerals are employed to designate similar parts, it will be observed that two pieces of sheet material 10 and 11 are shown with the marginal surfaces thereof placed in overlapping relation. As shown in Fig. 2 the marginal portion of the sheet 10 is formed with a plurality of parallel recesses or slots 12 which extend inwardly from the edge of the sheet and after these slots have been formed, the sheet 10 is positioned in its above mentioned proper overlapping relation with respect to the sheet 11. A pair of suitable electrodes 14 and 15, electrically connected with a suitable source of current supply 17, are associated with the sheets 10 and 11 in aligned relation and with the contact surfaces of the electrodes positioned intermediate a pair of adjacent slots 12. These slots separate the margin of the sheet 10 into elongated portions 13. Pressure may be applied to the electrodes 14 and 15 by any conventional means and current from the source of supply 17 passes through the electrodes to form a weld 18 within a localized area of the plates 10 and 11. Upon the completion of one weld, the electrodes are moved into welding position with respect to the next ajacent elongated portion 13 and the above described operation repeated. These welding operations are successively made until the required number of welds have been made so as to complete the joining of the two sheets.

This method of welding is to be distinguished from a method in which the recesses or slots 12 are not preliminarily formed in one of the sheets. If the sheets were to be welded in the described manner without providing slots 12, inter-weld stresses which might be set up in the sheets 10 and 11 as a result of any unequal heating of the two sheets, might have a direct effect upon the strength of the joint made. By providing the slots 12, however, these inter-weld stresses are greatly relieved. This will be readily appreciated when it is understood that in the event that the surface contact resistance of one of the electrodes with its respective sheet is greater than the other, the surface temperature of the former sheet will be correspondingly higher than the surface temperature of the latter and the degree of expansion of the sheets will vary. Should the sheets be unequally heated as above described during the making of the first weld and a second weld made immediately upon the completion of the first without the presence of the slot 12, the sheet which was heated to the highest temperature would be placed in tension between the two welds upon cooling and the other sheet would be placed in compression. This would be due to the fact that the two members would be fastened together at two points before the expansion of each had a chance to equalize through the interchange of heat. Thus it will be clear that due to the slots 12 which separate the margin of the sheet 10 into the elongated portions 13, any variations in expansion between these elongated portions and adjacent contacting portions of the sheet 11 will be equalized through the interchange of heat independently of the interchange of heat which may take place upon the subsequent making of a weld in an adjacent portion 13.

In practicing this improved method of welding, the flow of heating current through the sheets is localized. Thus, for example, when a second weld is being made there might be a tendency for a portion of the current to be shunted through the first completed weld were it not for the presence of the intermediate slot 12. These slots 12 serve to interrupt the direct current path which passes through the first completed weld and as a result the same amount of effective heating current flows through each weld as it is being formed and the welded area of all the welds will be uniform.

By following this method which relieves inter-weld stresses and localizes the effective heating current the spaced intervals between the welds may be considerably smaller than the spaces between welds which are made without the use of intervening slots or recesses. The welds which are made by the practice of this improved method will be uniform in area and will present a very firm and strong joint. It will be apparent that in forming the slots 12, it is preferable to have the slots or openings arranged so as to extend in a direction substantially parallel with the stresses to which the welded pieces may be subjected by external forces.

Although this method of welding is described in connection with an electrical spot welding apparatus, it is to be understood that various other forms of welding apparatus may be employed in practicing this improved method and the invention is limited only by the scope of the appended claims.

What is claimed is:

1. The method of welding parts having substantially the same electrical resistance characteristics, which consists in forming a recess in one of the parts to prevent the introduction of inter-weld stresses, placing the parts in proper juxtaposition, and welding the parts together by the application of heat and pressure to produce welds at positions spaced and oppositely disposed from the recess.

2. The method of welding the margins of sheet material having substantially the same thickness and the same electrical resistance characteristics, which consists in forming a plurality of marginal slots in one of the sheets to prevent the introduction of inter-weld stresses, placing the sheets in proper juxtaposition, and welding the sheets together by the application of heat and pressure to produce welds at positions spaced from and between the slots.

In witness whereof, I hereunto subscribe my name this 27 day of August A. D., 1926.

EMERSON PUGH.